(12) United States Patent
Takata

(10) Patent No.: US 7,082,846 B2
(45) Date of Patent: Aug. 1, 2006

(54) SEAT STRUCTURE AND DEVICE FOR DETERMINING LOAD ON SEAT

(75) Inventor: Yasuhide Takata, Hiroshima (JP)

(73) Assignee: Delta Tooling Co., Ltd, Hiroshima (JP)

( * ) Notice: Subject to any disclaimer, the term of this patent is extended or adjusted under 35 U.S.C. 154(b) by 0 days.

(21) Appl. No.: 10/849,326

(22) Filed: May 19, 2004

(65) Prior Publication Data

US 2004/0239514 A1    Dec. 2, 2004

(30) Foreign Application Priority Data

May 21, 2003    (JP) .............................. 2003-180295

(51) Int. Cl.
*G01L 1/26*    (2006.01)
(52) U.S. Cl. ................................. 73/862.391
(58) Field of Classification Search ........... 73/862.391, 73/862.42, 862.451
See application file for complete search history.

(56) References Cited

U.S. PATENT DOCUMENTS 6,786,104 B1 *   9/2004   Aoki ..................... 73/862.472
2002/0145418 A1 *  10/2002   Becker ..................... 324/207.2

* cited by examiner

*Primary Examiner*—Max Noori
(74) *Attorney, Agent, or Firm*—Wolf Block Schorr & Solis-Cohen LLP

(57) ABSTRACT

The seat structure includes a torsion bar as an elastic supporting-mechanism for elastically supporting a cushioning member, and is provided with arms and a supporting frame pivoted by the torsion bar. Accordingly, a device for determining a load on the seat can be structured with an extremely simple structure by providing a displacement detecting mechanism to detect the amount of twist or the twist angle of the torsion bar, or a pivot angle of the arm, displaced by being seated.

9 Claims, 15 Drawing Sheets

F I G. 1
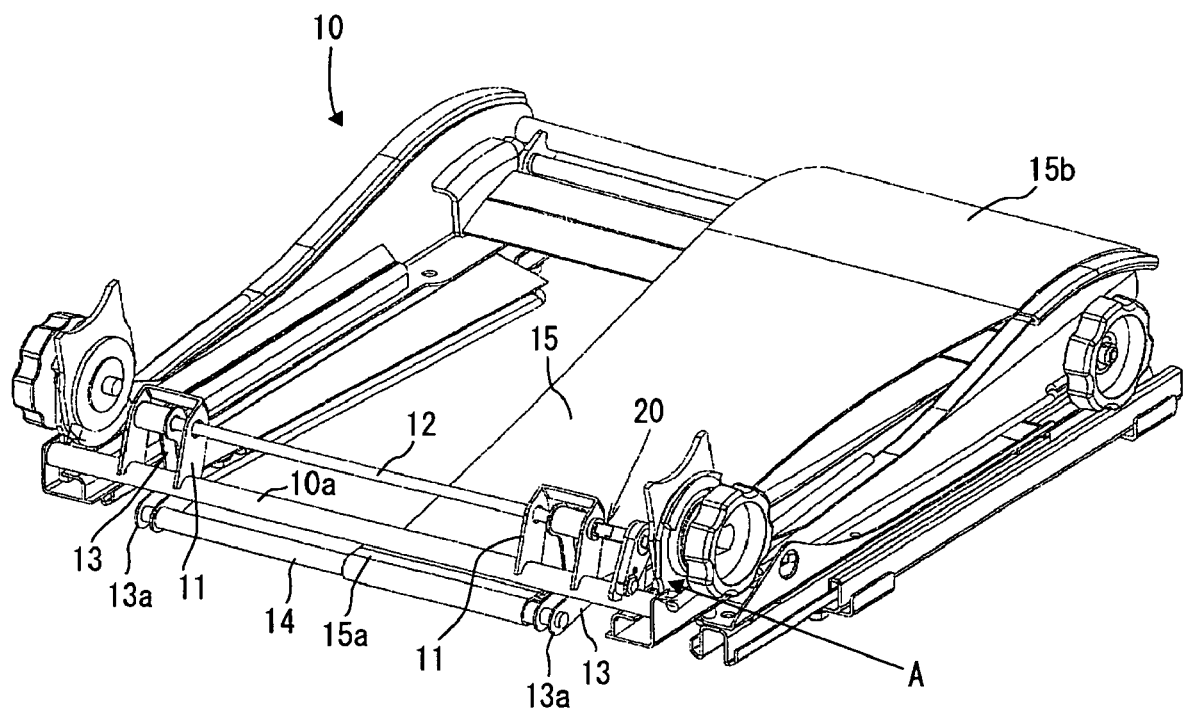

F I G. 5
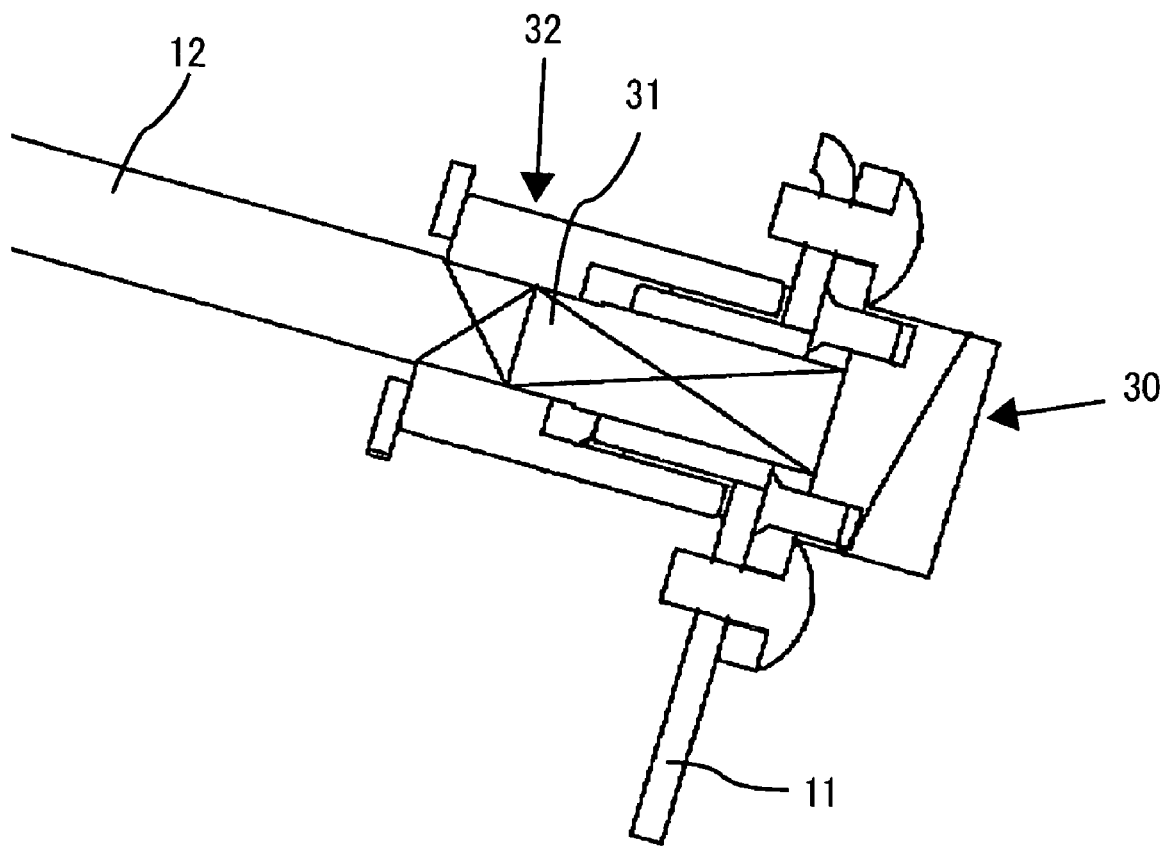

F I G. 8
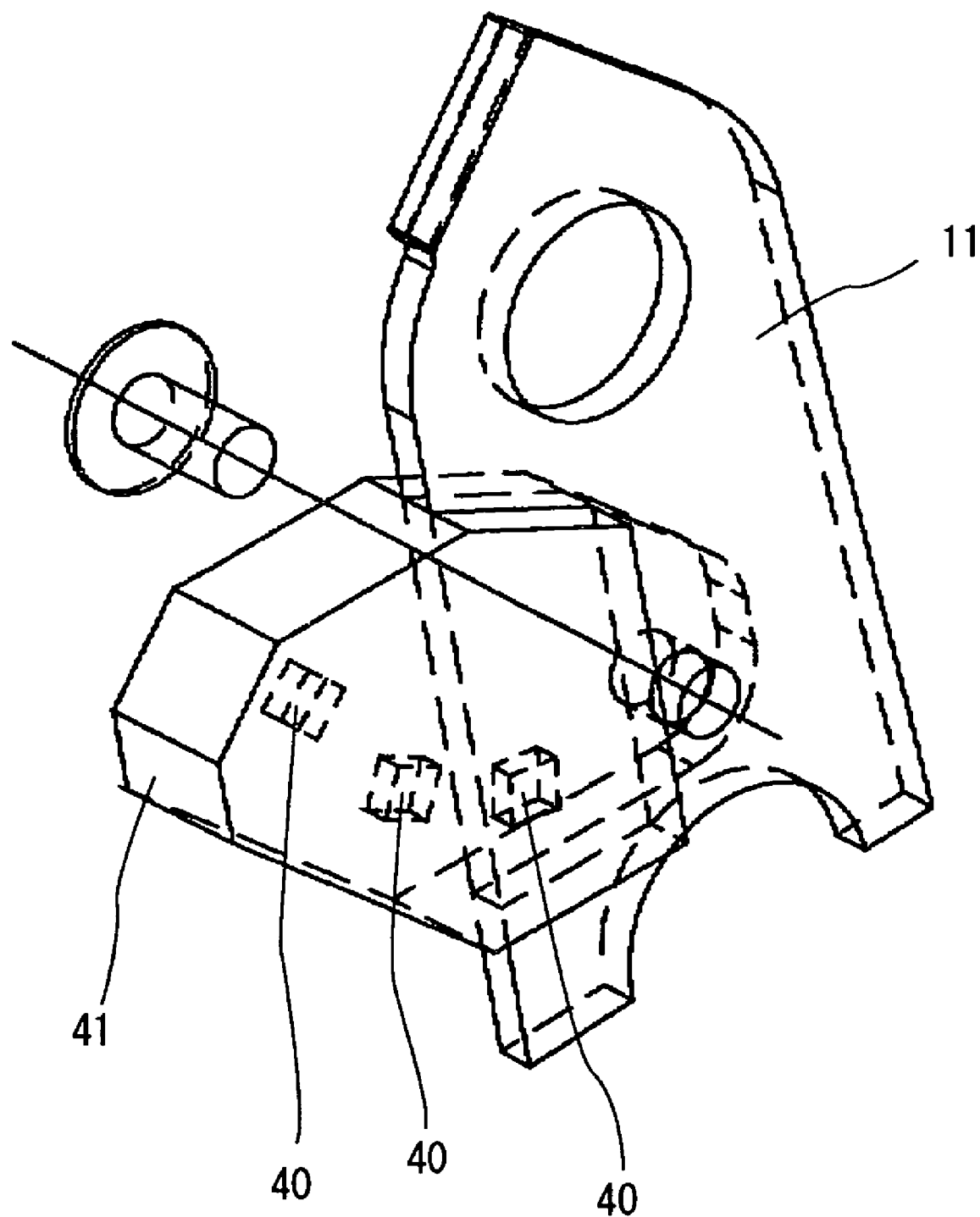

SEAT STRUCTURE AND DEVICE FOR DETERMINING LOAD ON SEAT

FIELD OF INVENTION

The present invention relates to a seat structure to be able to detect load and a device for determining a load on a seat.

BACKGROUND OF THE INVENTION

It is pointed out that an airbag of a vehicle has a potential for disturbing smooth breathing when a passenger is, for example, a child at the time of inflating the airbag. It is also pointed out that in the case of a child seat being installed on a front passenger's seat in a rear-facing state, there is a potential to push the child seat backwards to give a shock to a child who is seated on the child seat, when the airbag is inflated. In order to solve the above problem, there has been a well-known technique to determine the weight of a seated person to distinguish between an adult and a child or between a man of big physique and a man of small physique so as to perform inflation control of the airbag, attitude control of the seat, or the like.

For instance, Patent Document 1 (Japanese Patent Publication Laid-open No. 2003-25890) discloses a configuration of installing a device for determining a load on a seat composed of a combination of a sensor block and a strain gauge on a lower portion of a guide rail supporting the seat.

However, as disclosed in Patent Document 1, since the conventional device for determining a load on the seat is installed on the lower portion of the guide rail, in order to provide the device for determining the load, it is necessary to change the design of the entire seat structure such as adjustment of an installation position of a slide adjuster of the seat and so on. This is because an ordinary seat used in a vehicle or the like is structured such that a cushioning member made of polyurethane foam having a thickness of about 10 cm is mounted on a seat frame, which forces something to detect the load of the seat to dispose beneath the seat.

On the other hand, the present applicant proposes a seat structure in which the rear of the cushioning member of the seat cushion is allowed to be elastically supported via a torsion bar so that the tension of the cushioning member can be made different between the times when someone is seated and no one is seated, and improvement in vibration absorbing characteristic, impact absorbing characteristic, body pressure dispersibility, attitude supportability, and so on can be achieved. In such a seat structure, since the rear portion of the cushioning member is supported by a supporting frame connected to the torsion bar disposed on the rear of a seat, when a person takes the seat, the torsion bar is twisted so that the supporting frame is pivoted at an angle to tilt forwards. Accordingly, when a displacement detecting mechanism to detect a twist of the torsion bar or the rotation angle of the supporting frame is arranged on such a seat structure, determination of the load on the seat becomes possible without changing the basic design of a seat structure required to exhibit the above-described vibration absorbing characteristic and impact absorbing characteristic, and without affecting the design of attachment mechanisms such as a slide adjuster, a reclining mechanism and so on.

OBJECTS AND SUMMARY OF THE INVENTION

The present invention has been made in consideration of the circumstances described above, and an object of the present invention is to provide a seat structure and a device for determining a load on a seat, capable of easily mounting a displacement detecting mechanism thereon and capable of determining the load on the seat with a very simple structure by employing a torsion bar as an elastic supporting-mechanism to elastically support a cushioning member for the seat structure.

In order to solve the above-described problem, the present invention provides a seat structure including a cushioning member strained over a seat cushion via an elastic supporting-mechanism, in which the elastic supporting-mechanism is structured including a torsion bar disposed in the rear of a seat cushion and a supporting frame connected to the torsion bar and biased or urged so as to tilt backwards in a normal state, the cushioning member is supported by the supporting frame, and strained by the elastic force of the torsion bar, and a displacement detecting mechanism for detecting displacement of the elastic supporting-mechanism is provided when a load is applied to the cushioning member, so that the load applied to the cushioning member is detectable from a displacement signal detected by the displacement detecting mechanism.

The present invention further providing a seat structure in which the supporting frame is supported via an arm connected to the torsion bar.

The present invention further providing a seat structure in which the displacement detecting mechanism is structured to include a strain gauge mounted on the torsion bar to measure the amount of twist in the torsion bar with the strain gauge.

The present invention further providing a seat structure in which the displacement detecting mechanism is structured to include an angle sensor connected to a movable end of the torsion bar to measure a twist angle of the torsion bar with the angle sensor.

The present invention further providing a seat structure in which the displacement detecting mechanism is composed of a combination of a magnet and a magnetic sensor which changes its output characteristics according to the magnetic flux density of the magnet, and one is mounted on the arm member and the other is mounted on a frame member forming the seat cushion.

The present invention further providing a seat structure in which the magnetic sensor comprises a Hall IC.

An alternate embodiment of the present invention further providing a device for determining a load on the seat provided on a seat structure composed of a torsion bar disposed in the rear of a seat cushion and a supporting frame connected to the torsion bar and biased or urged so as to tilt backwards in a normal state, and structured that a cushioning member is supported by the supporting frame and strained by the elastic force of the torsion bar, in which the device for determining a load on the seat is structured to include a displacement detecting mechanism to detect displacement of the elastic supporting-mechanism when a load is applied to the cushioning member, so that the load applied to the cushioning member is detected from a displacement signal detected by the displacement detecting mechanism.

The present invention further providing a device for determining a load on the seat in which the displacement detecting mechanism is structured to include a strain gauge mounted on the torsion bar to measure the amount of twist in the torsion bar with the strain gauge.

The present invention further providing a device for determining a load on the seat in which the displacement detecting mechanism is structured to include an angle sensor connected to a movable end of the torsion bar to measure the twist angle of the torsion bar with the angle sensor.

The present invention further providing a device for determining a load on the seat in which the displacement detecting mechanism includes a combination of a magnet and a magnetic sensor which changes its output characteristics according to the magnetic flux density of the magnet, and one is mounted on the arm member connected to the torsion bar and the other is mounted on a frame member forming the seat cushion.

BRIEF DESCRIPTION OF THE DRAWINGS

The foregoing and still other objects and advantages of the present invention will be more apparent from the following detailed explanation of the preferred embodiments of the invention in connection with the accompanying drawings.

FIG. 1 is a diagrammatic perspective view showing a principal portion of a seat cushion composing a seat structure according to a first embodiment of the present invention;

FIG. 5 is a sectional view taken along the line B—B in FIG. 4

FIG. 8 is a view showing a bracket for fixing a Hall IC in detail;

DETAILED DESCRIPTION OF THE INVENTION

Figure 2:
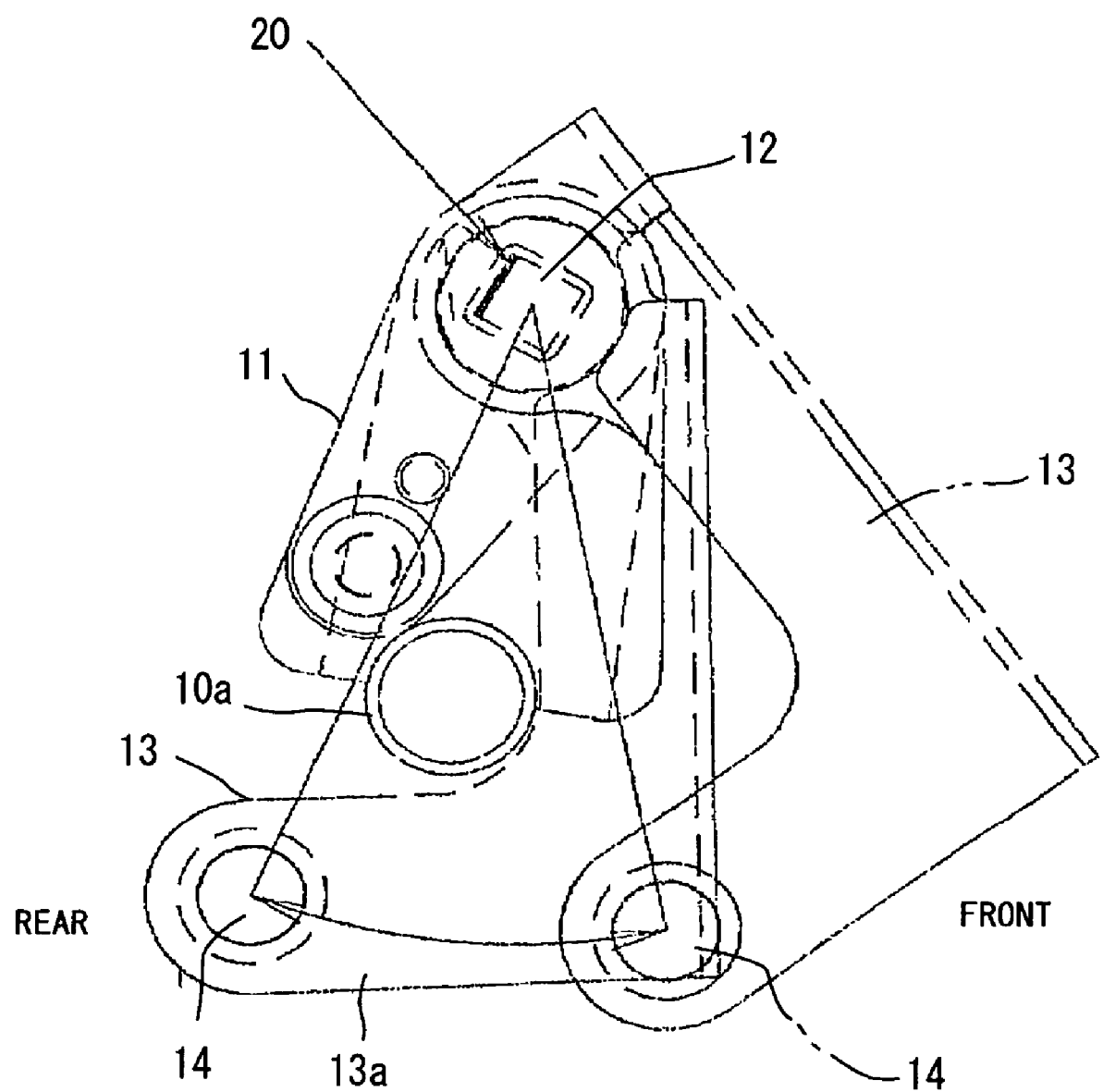
FIG. 2 is a sectional view taken along the arrow A in FIG. 1.

Hereinafter, the present invention will be explained in more detail based on embodiments shown in the drawings. FIG. 1 and FIG. 2 are views showing a principal portion of a first embodiment of the present invention. As shown in these drawings, a seat cushion 10 forming the seat structure of the present embodiment includes brackets 11, a torsion bar 12, arms 13, a supporting frame 14, a cushioning member 15, a strain gauge 20, and so on.

Two brackets 11 are fixedly disposed apart from each other on a rear frame 10a arranged across the width (in the width direction) in the rear of the seat cushion 10. The torsion bar 12 is fitted to one of the brackets 11 at one end (fixed end) and supported along the width direction of the seat cushion 10. Since the torsion bar 12 is rotatably supported at its other end (movable end) by the other bracket 11, the torsion bar 12 exhibits predetermined spring characteristics due to the twisting of the movable end.

The arms 13 are provided in the vicinity of respective end portions of the torsion bar 12. One arm 13 disposed on the fixed end side of the torsion bar 12 is rotatably disposed to the torsion bar 12 at the base end portion, and the other arm 13 disposed on the movable end side of the torsion bar 12 is directly connected to the torsion bar 12 at its base end portion and biased or urged so as to tilt backwards, as shown in FIG. 2 due to its twist torque.

The supporting frame 14 is disposed between the lower end portions 13a of the respective arms 13 across the width of the seat cushion 10. The cushioning member 15 is supported by the supporting frame 14 at the rear portion 15a and fixed by an arbitrary frame member disposed ahead of the seat cushion 10 at the front portion 15b so that the cushioning member 15 is strained in the longitudinal direction of the seat cushion 10. (It should be noted that the terms "arbitrary frame member" in this specification mean tubular members and plate-shaped members which form a basic shape of the seat cushion such as side frames, a rear frame, and the like as well as any member including shaft members, metal parts, rings, and so on attached to these tubular members and the like).

Thus, an elastic supporting-mechanism to elastically support the cushioning member 15 is composed of the above-described torsion bar 12, arms 13, and the supporting frame 14. In the present embodiment, as described above, the torsion bar 12 is supported by the brackets 11 protruding upwards on the rear frame 10a, the arms 13 are connected to the torsion bar 12 at the base end portions so as to dispose downwards, and the supporting frame 14 supporting the cushioning member 15 is provided on the lower end portions 13a of the arms 13. Thus, as shown in FIG. 2, it is structured such that the lower ends of the arms 13 and the supporting frame 14 pivot back and forth with the torsion bar 12 disposed above as a center. However, the positional relationship of installation between the arm 13 and the supporting frame 14 pivotably supported by the torsion bar 12 is not limited to the above, for instance, the brackets 11 may be allowed to protrude downwards from the rear frame 10a, so as to dispose the torsion bar 12 on the lower side, and the arms 13 and the supporting frame 14 on the upper side.

For the cushioning member 15, a two-dimensional net member, a thin-type polyurethane material, a solid knitted fabric, or the like can be used. In any case, it is acceptable so long as it can be elastically supported by the torsion bar 12 via the arms 13 and the supporting frame 14. The solid knitted fabric is produced by using a Double Raschel knitting machine or the like in a manner that connecting yarn is allowed to shuttle to-and-fro between a pair of ground knitted fabrics disposed at a predetermined interval. The adoption of such a solid knitted fabric as a tension structure realizes to sufficiently exhibit the requested cushionability even in a thin-type. Incidentally, it is optional to provide other cushioning layers as necessary below or above the cushioning member 15 supported by the supporting frame 14 connected to the torsion bar 12.

The displacement detecting mechanism of the present embodiment is composed of a strain gauge 20. The strain gauge 20 is mounted on the torsion bar 12, and when the torsion bar 12 is twisted by a load applied to the cushioning member 15, the strain gauge 20 strains in proportion to the amount of twist. Accordingly, the load can be determined from the correlation between the amount of twist and the load. An electric signal outputted from the stain gauge 20 is sent to a controller for controlling an airbag and the like via, for instance, a microcomputer (not shown) having a program for computation to convert the amount of strain into the load on the seat. Then, it becomes possible to control the degree of inflation of the airbag, by using a prescribed threshold value as the criteria, and by determining, for instance, a person exceeding the threshold value to be an adult or a man with a big physique, or a person under the threshold value to be a child or a man with a small physique. Needless to say, the mechanism to be controlled is not limited to the control mechanism for an airbag, but an adjustment mechanism of a vehicle seat position, the pretensioner of a seat belt, or the like can be controlled by sending an electric signal of the strain gauge 20.

According to the present embodiment, the cushioning member 15 is elastically supported by the supporting frame 14 connected to the torsion bar 12 via the arms 13. Accordingly, when a person takes a seat, the cushioning member 15 is depressed, which results in tilting forwards of the arms 13 and the supporting frame 14 so that the torsion bar 12 is twisted. Therefore, a device for determining a load on the seat can be structured with an extremely simple configuration of providing a displacement detecting mechanism composed of the strain gauge 20 on the torsion bar 12.

Figure 3:
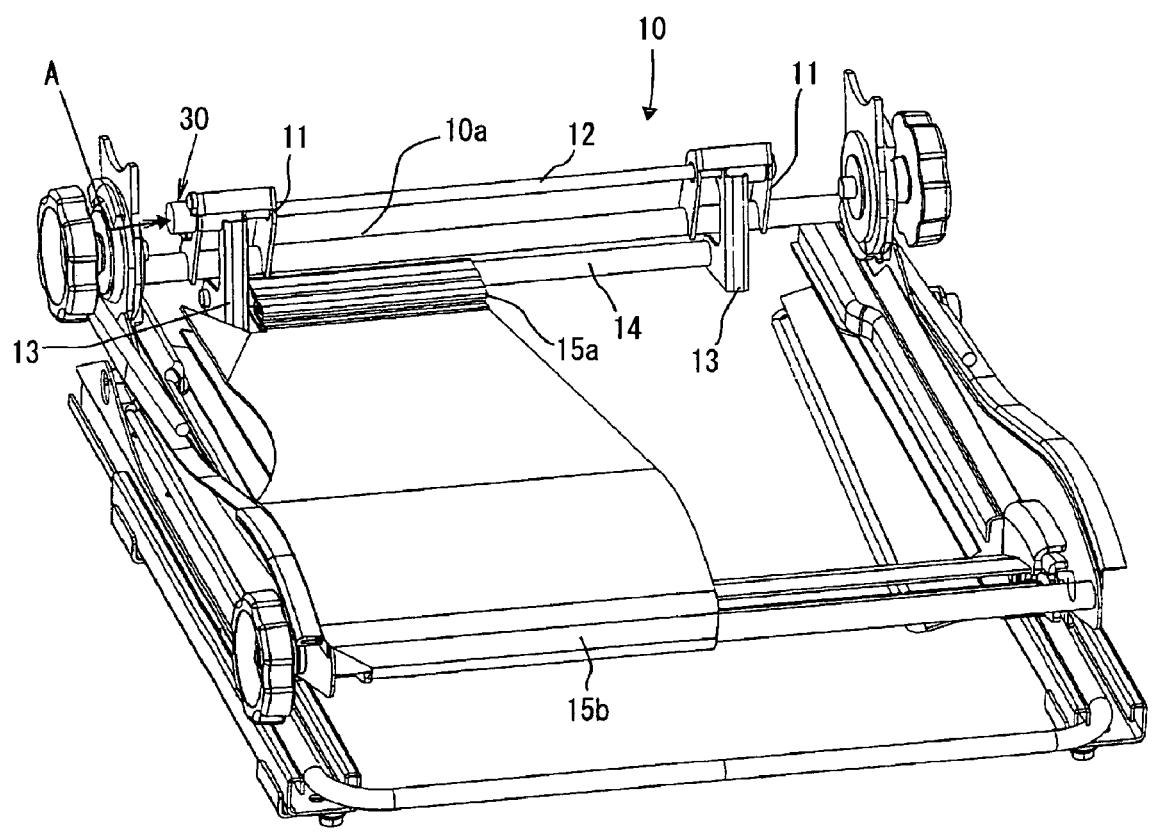
FIG. 3 is a diagrammatic perspective view showing a principal portion of a seat cushion composing a seat structure according to a second embodiment of the present invention.
Figure 4:
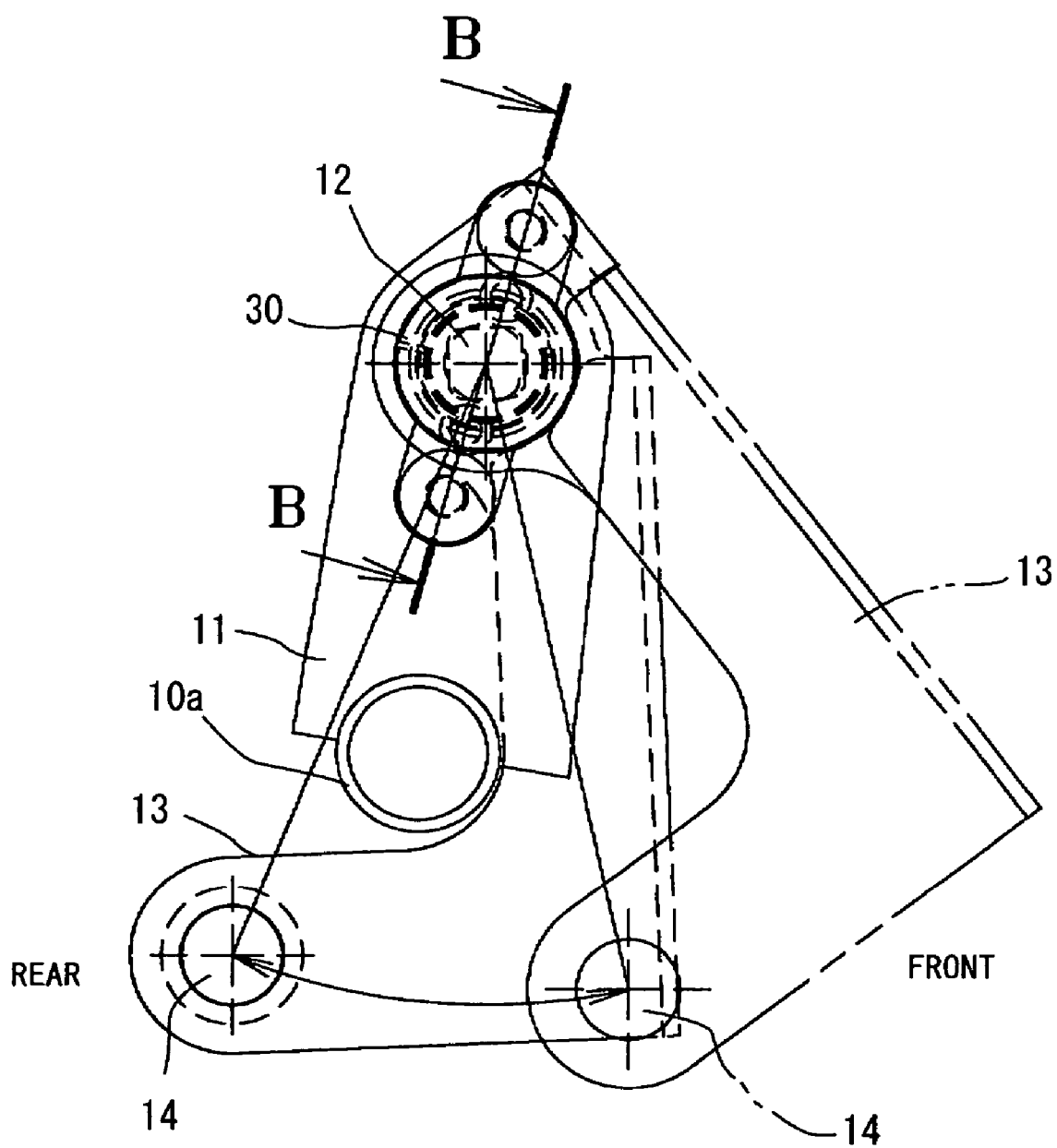
FIG. 4 is a sectional view taken along the arrow A in FIG. 3.

FIG. 3 to FIG. 5 are views showing a principal portion of the seat structure according to a second embodiment of the present invention. In the present embodiment, an angle sensor 30 is used instead of the strain gauge 20 of the first embodiment as a displacement detecting mechanism constituting the device for determining a load on the seat. The angle sensor 30 is connected and fixed to a movable end of the torsion bar 12 via a bush 32 at its tip 31. The other components are the same as those in the above-described first embodiment.

According to the present embodiment, when the cushioning member 15 is depressed by being seated by a person, which results in tilting forwards of the arms 13 and the supporting frame 14 so that the torsion bar 12 is twisted. When the torsion bar 12 is twisted by a predetermined angle, the twisted angle is transmitted to the angle sensor 30. As a result, the load on the seat can be determined from a correlation between the twist angle detected by the angle sensor 30 and the load on the seat.

Figure 6:
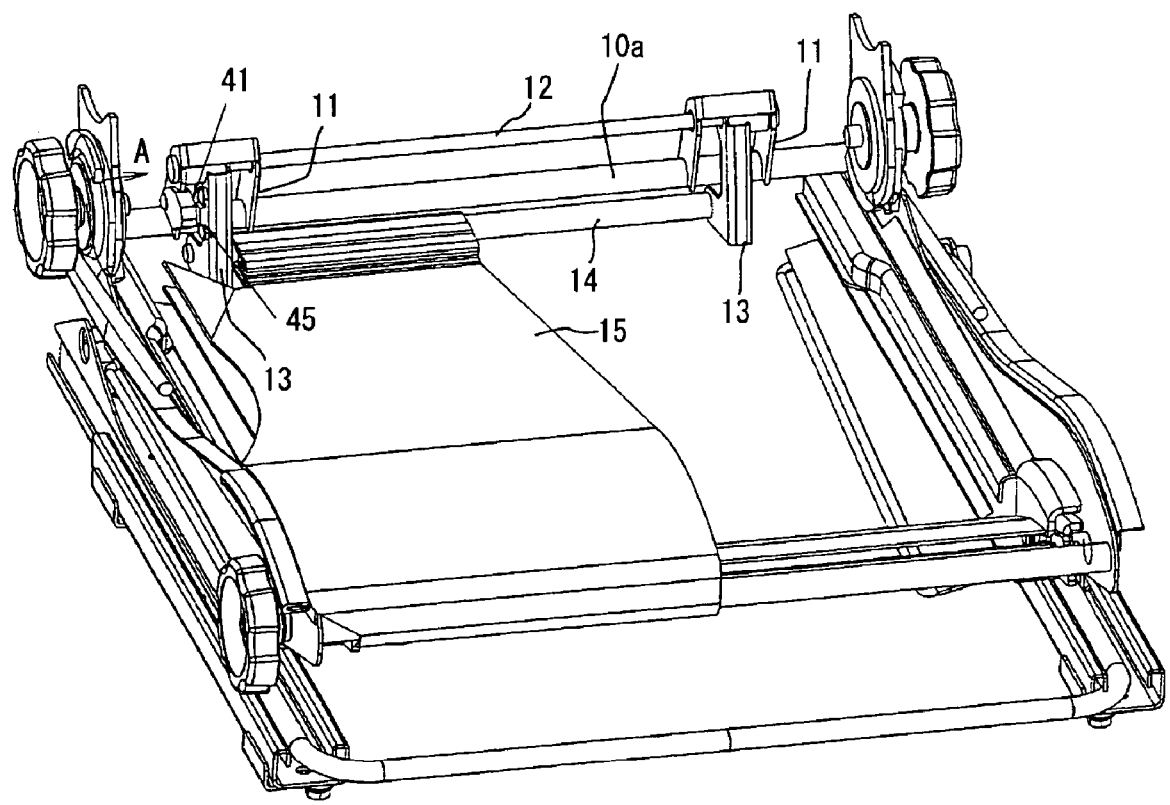
FIG. 6 is a diagrammatic perspective view showing a principal portion of a seat cushion composing a seat structure according to a third embodiment of the present invention.
Figure 7:
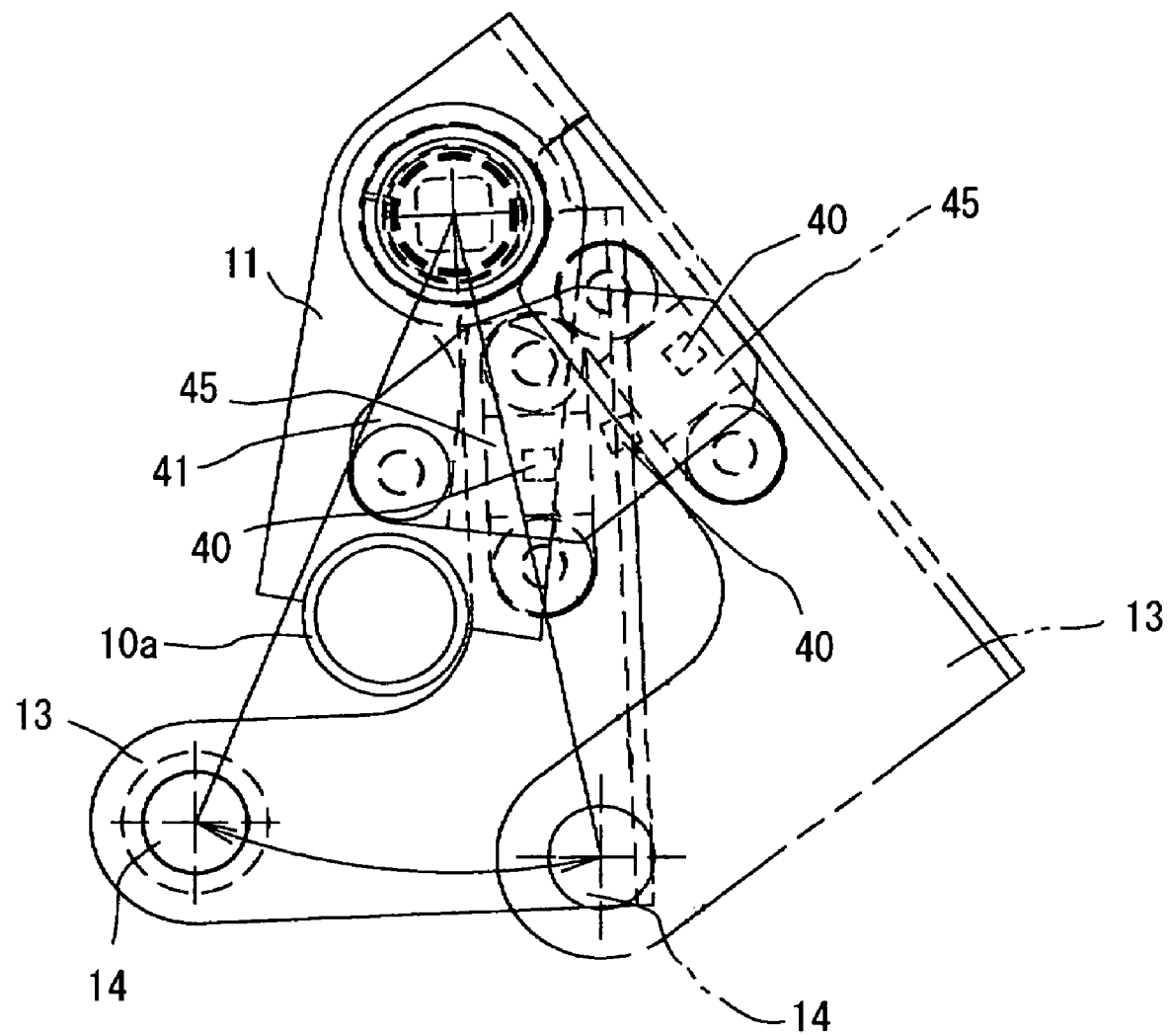
FIG. 7 is a sectional view taken along the arrow A in FIG. 6.

FIG. 6 to FIG. 8 are views showing a principal portion of the seat structure according to a third embodiment of the present invention. In the present embodiment, a combination of a Hall IC 40 as a magnetic sensor and a magnet 45 is used as a displacement detecting mechanism constituting the device for determining a load on the seat. The other constituents are the same as those used in the first and the second embodiments.

In the present embodiment, three Hall ICs 40 are disposed on a bracket 41 for fixing Hall IC at nearly equal intervals substantially in an arc-shape, as shown in FIG. 7 and FIG. 8, and the bracket 41 for fixing Hall IC is fixed on a side face of the bracket 11 fixed on the rear frame 10a. Meanwhile, the magnet 45 is fixed on the sides of the arms 13 so as to face the bracket 41 for fixing Hall IC. The arms 13 pivot at an angle to tilt forwards when the cushioning member 15 is depressed by being seated by a person. Accordingly, when degree of the pivot is varied, respective output voltages of the three Hall ICs 40 arranged substantially in an arc-shape on which the magnetic field of the magnet 45 works fluctuate according to the change of the magnetic flux density. Applying this phenomenon, a correlation between the fluctuation of the output voltages of the respective Hall ICs 40 and the pivot angles of the arms 13, and a correlation between the pivot angles of the arms 13 and a load on the seat are defined, which are set in a microcomputer or the like similarly to the above embodiments. This makes it possible to determine the load of a seated person on the cushioning member 15.

It should be noted that the bracket 41 for fixing Hall IC is provided on the side face of the bracket 11, and the magnet 45 is disposed on the side face of the arm 13 in the present invention. When the bracket 41 for fixing Hall IC and the magnet 45 are disposed as above, a portion of the bracket 41 for fixing Hall IC facing the magnet 45 is displaced by the pivoting of the arm 13. If only one Hall IC is provided under such displacement, it is sometimes difficult to detect the magnetic field because of high directivity of the Hall IC 40. Therefore, when the magnet 45 is fixed on the side face of the arm 13 as in this embodiment, it is preferable to provide a plurality of the Hall ICs 40 substantially in an arc-shape on the bracket 41 for Hall IC fixed on the side face of the bracket 11 conforming to the pivoting range of the arm 13 (magnet 45).

Figure 9:
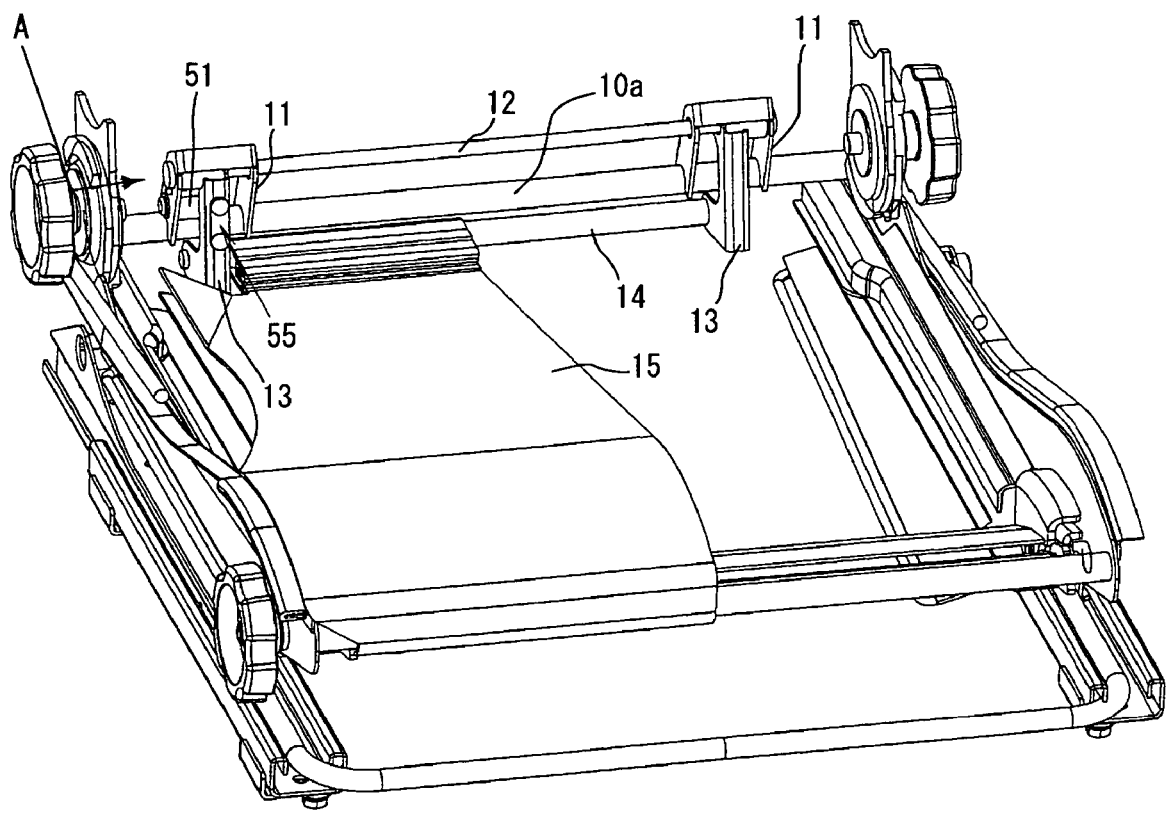
FIG. 9 is a diagrammatic perspective view showing a principal portion of a seat cushion composing a seat structure according to a fourth embodiment of the present invention.
Figure 10:
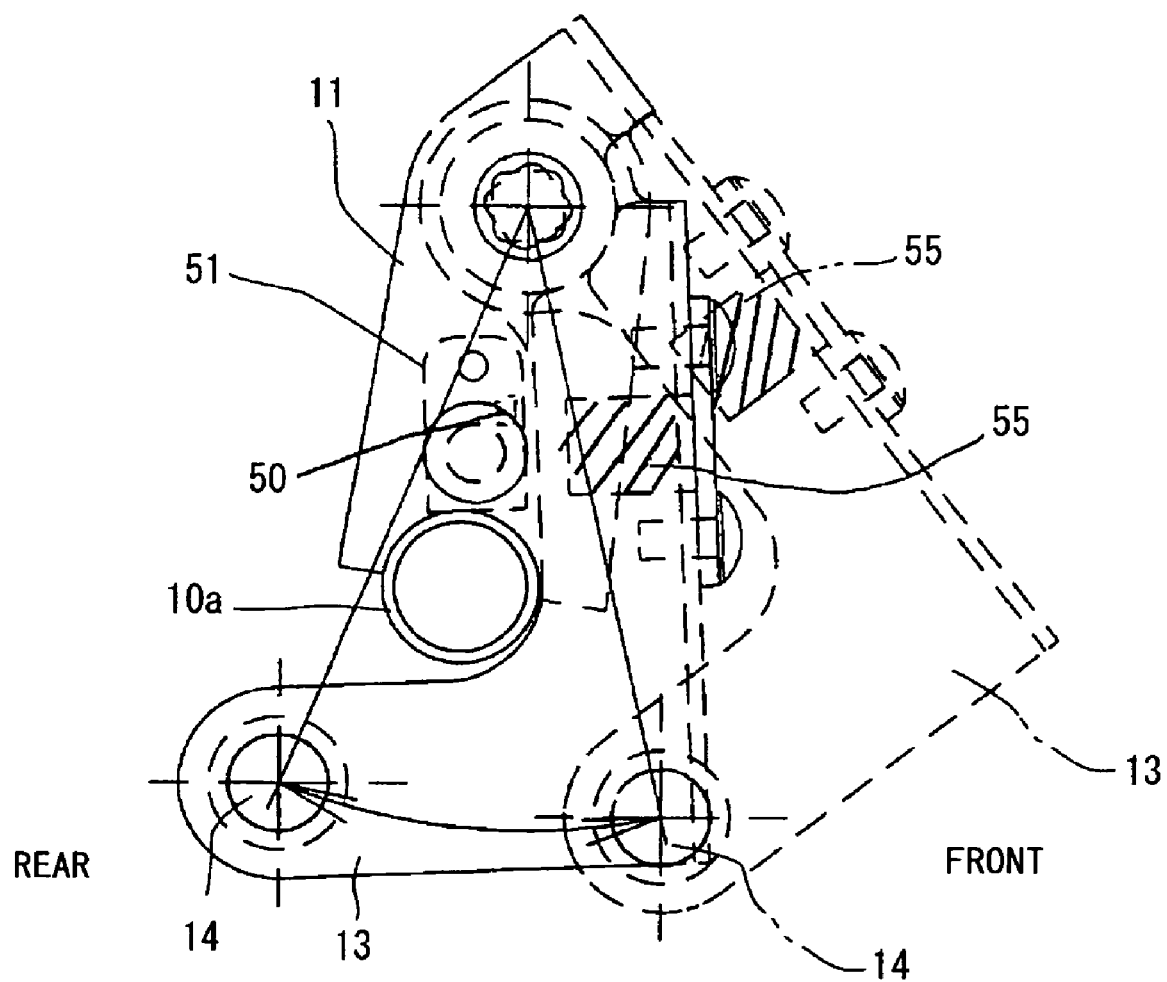
FIG. 10 is a sectional view taken along the arrow A in FIG. 9.
Figure 11:
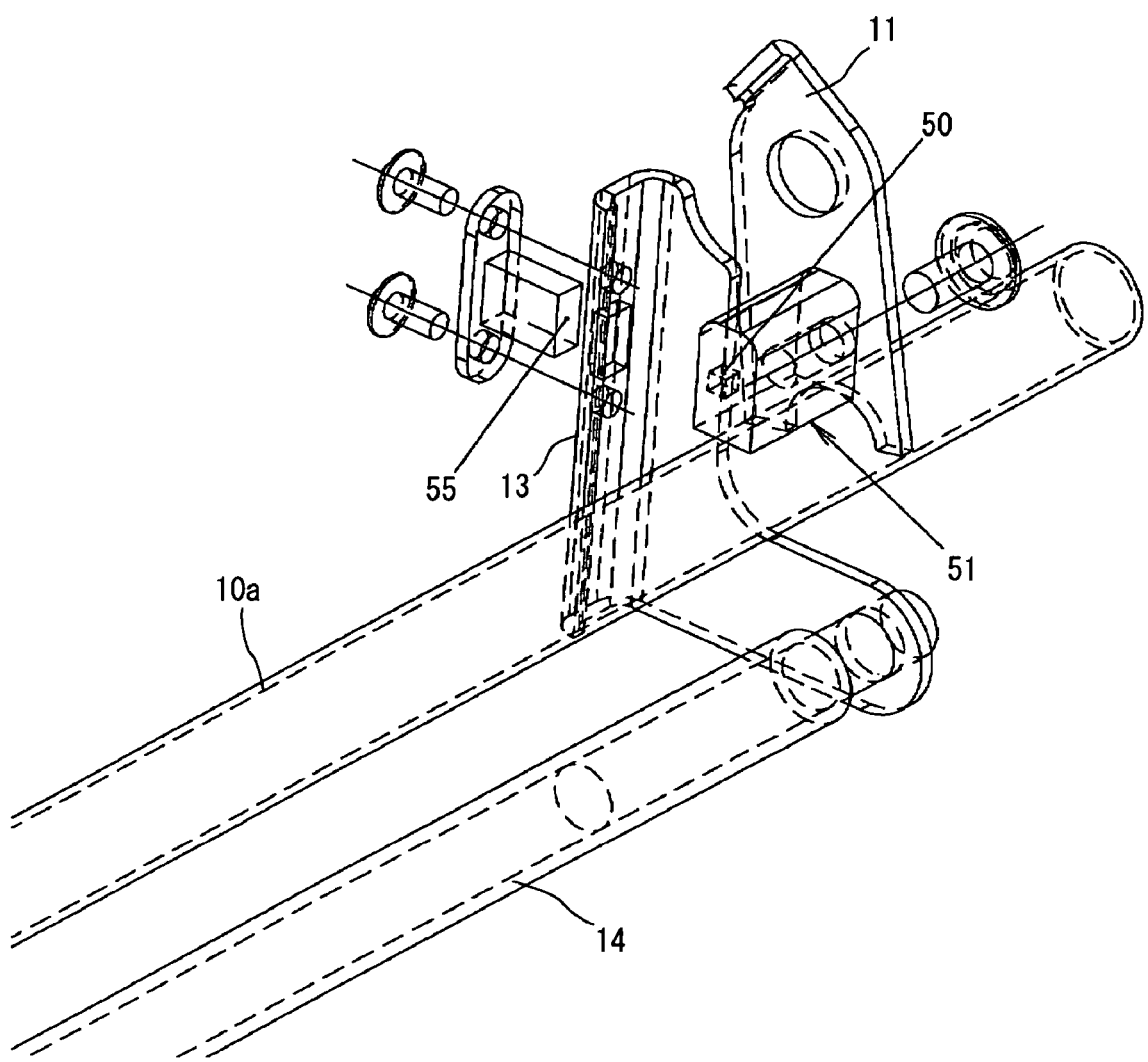
FIG. 11 is a view showing a bracket for fixing a Hall IC and a magnet in detail.

FIG. 9 to FIG. 11 are views showing a principal portion of the seat structure according to a fourth embodiment of the present invention. The present embodiment is similar to the third embodiment in that a combination of a Hall IC 50 and a magnet 55 is used as the displacement detecting mechanism. However, a bracket 51 for fixing Hall IC in which only one Hall IC 50 is embedded is used in the present embodiment.

Since the Hall IC 50 has high directivity as described above, the Hall IC 50 and the magnet 55 are required to be fixed in a manner substantially to face each other even when the arm 13 pivots. Accordingly, in the present embodiment, the bracket 51 for fixing Hall IC is fixed to protrude inwards with respect to the bracket 11 of the rear frame 10a, so as to face the arm 13. The magnet 55 is fixed on the front plate of the arm 13 which faces the rear frame 10a. As a result, as shown in FIG. 10, even when there is only one Hall IC 50 which is embedded in the bracket 51 for Hall IC, the magnet 55 is disjunctive substantially facing the Hall IC 50 within the pivoting range of the arm 13. Since the output voltage of the Hall IC 50 changes when the distance between the magnet 55 and the Hall IC 50 is varied by being taken a seat by a person on the cushioning member 15, a load on the seat by a person can be determined similarly to the third embodiment from a correlation between the output voltage and the pivot angle of the arm 13.

Figure 12:
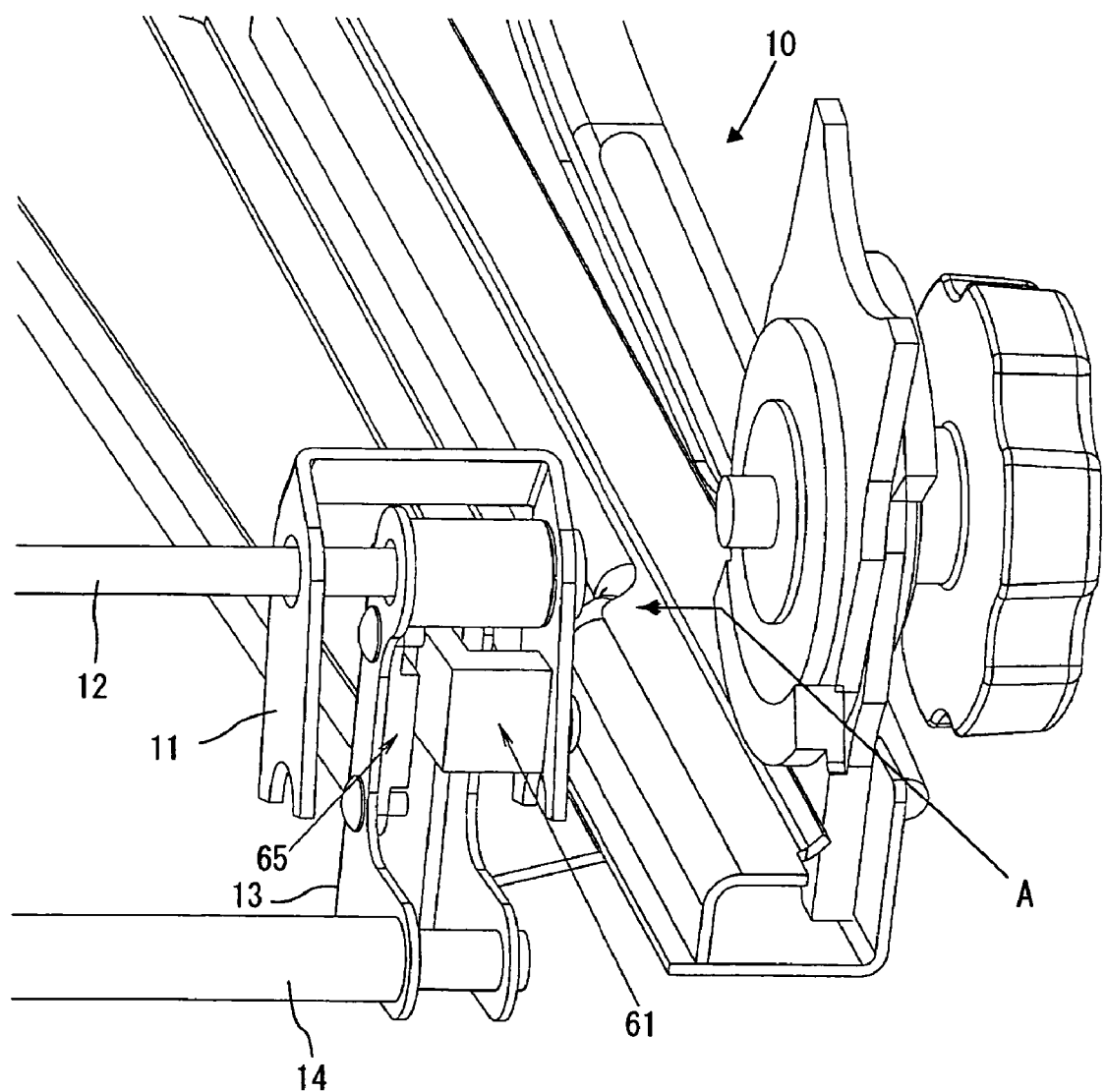
FIG. 12 is a diagrammatic perspective view showing a principal portion of a seat cushion composing a seat structure according to a fifth embodiment of the present invention.
Figure 13:
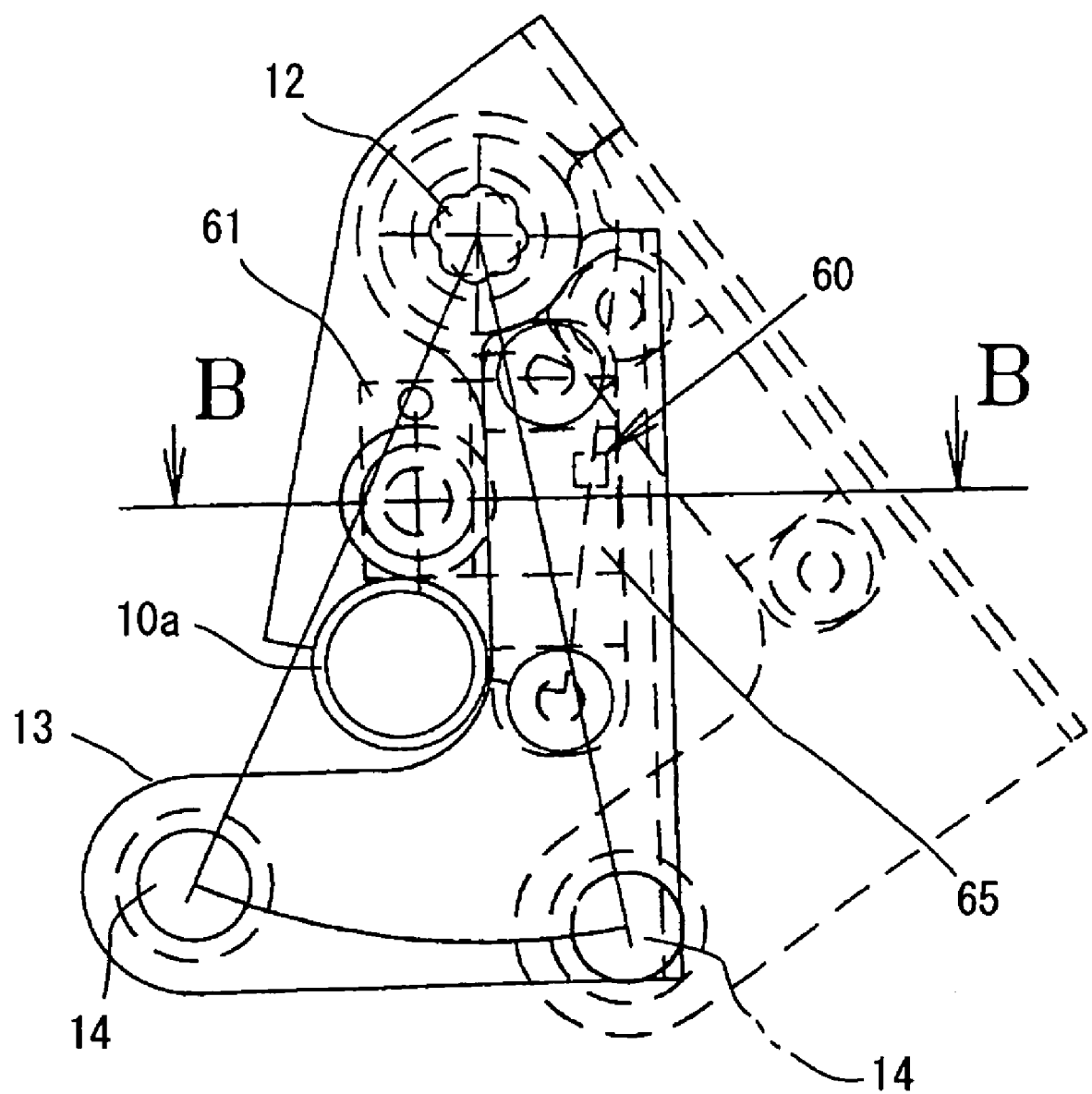
FIG. 13 is a sectional view taken along the arrow A in FIG. 12.
Figure 14:
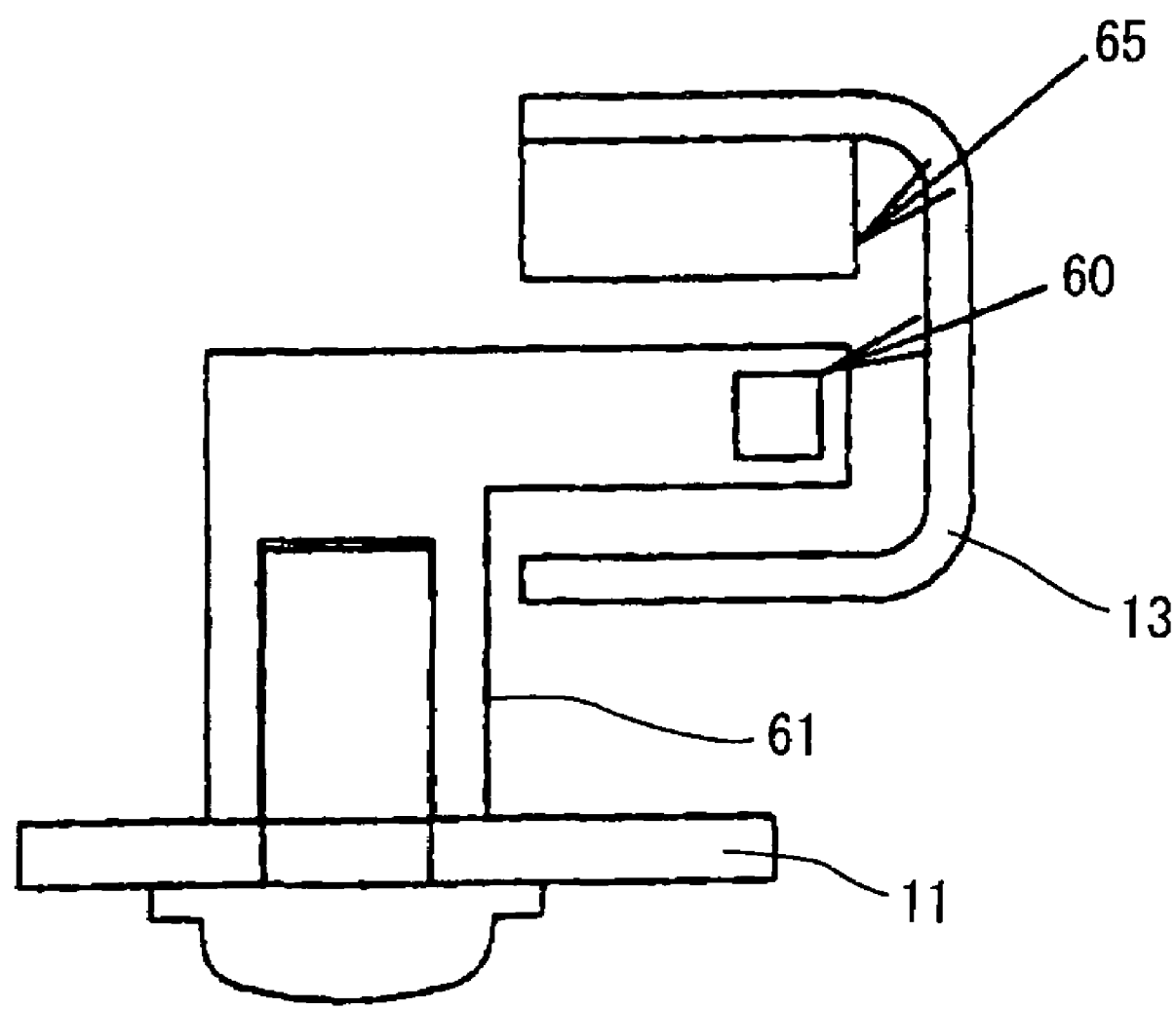
FIG. 14 is a sectional view taken along the line B—B in FIG. 13.
Figure 15A:
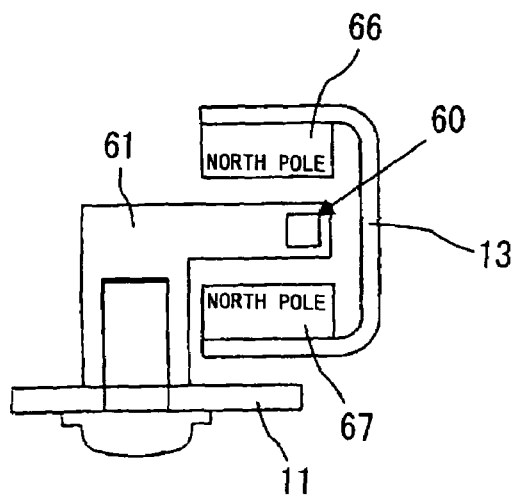
FIG. 15A to FIG. 15E are views showing various embodiments of a magnet structure forming a displacement detecting mechanism.
Figure 15B:
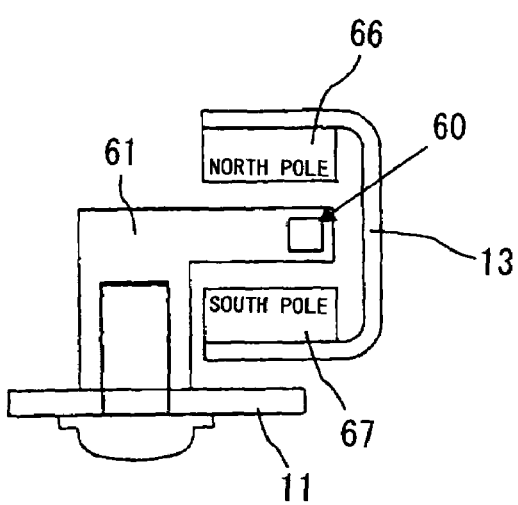
Figure 15C:
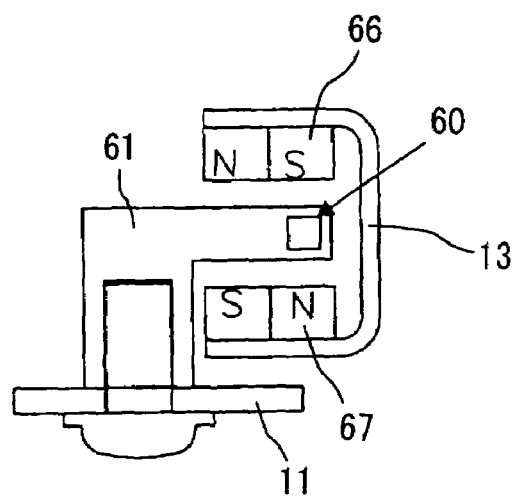
Figure 15D:
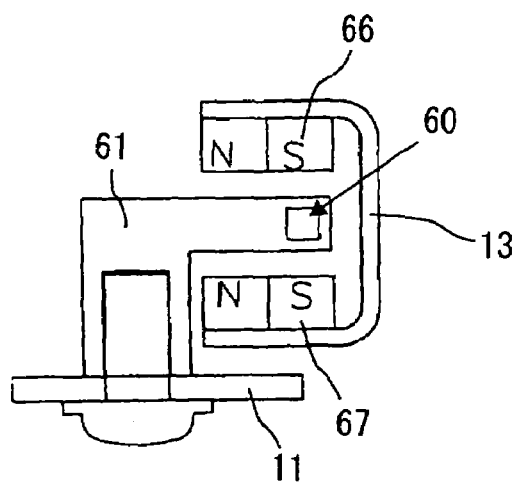
Figure 15E:
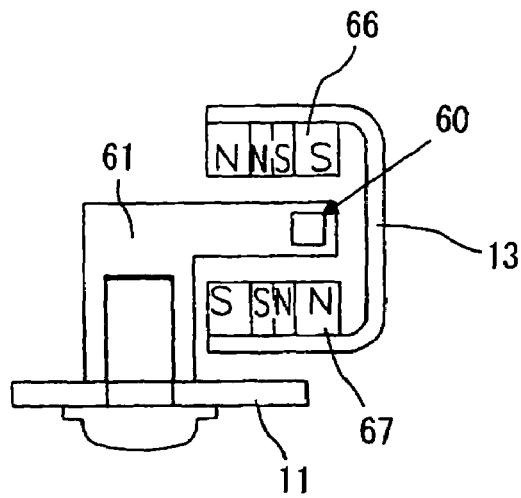

FIG. 12 to FIG. 14 are views showing a principal portion of a seat structure according to a fifth embodiment of the present invention. The present embodiment is similar to the third and fourth embodiments in that a combination of a Hall IC 60 and a magnet 65 is used as the displacement detecting mechanism.

In the present embodiment, a bracket 61 for fixing Hall IC is formed substantially in an L-shape, a bent end portion of the bracket 61 for fixing Hall IC is fixed on the inside of the bracket 11 protruding from the rear frame 10a so as to face the arm 13, and the Hall IC 60 is embedded in the vicinity of the bent end portion. The magnet 65 is fixed on the inside of the arm 13 to face the Hall IC 60. Also, in the present embodiment, as shown in FIG. 13, since the magnetic flux density of the magnet 65 detected by the Hall IC 60 varies when the arm 13 pivots under the weight of a seated person, the output voltage of the Hall IC 60 varies, thereby enabling the detection of a load on the seat similarly to the above-described respective embodiments. Incidentally, in the present embodiment, since no more than one Hall IC 60 is embedded, the positional relationship with the magnet 65 is displaced by the pivoting of the arm 13. Needless to say, though it has no problem with such a structure so long as the output voltage varied by deviation from the positional relationship with the Hall IC 60 is kept obtainable, considering the directivity of the Hall IC 60, it is possible to structure that a plurality of the Hall ICs 60 are arranged inside the bracket 61 for fixing Hall IC substantially in an arc-shape along the orbit of the arm 13, similarly to the above-described third embodiment, or the magnet 65 is disposed on the front plate of the arm 13 similarly to the fourth embodiment, and a detecting face of the Hall IC 60 is allowed to face the magnet 65.

In the fifth embodiment shown in FIG. 12 to FIG. 14, the bracket 61 for fixing Hall IC is formed substantially in an L-shape and its bent end portion is allowed to face the arm 13 as described above. Accordingly, as shown in FIG. 15A to FIG. 15E, by making a structure of disposing a pair of magnets 66 and 67 on respective side faces of the arms 13 facing each other while sandwiching the Hall IC 60 disposed on the bent end portion, it is possible to strengthen the magnetic field working on the Hall IC 60 to enhance the sensitivity. In that event, as shown in FIG. 15A to FIG. 15E, various combinations are conceivable as a structure to arrange the magnets 66 and 67. For instance, a structure to let the same poles face each other (refer to FIGS. 15A and 15D), or to let the different poles face each other (refer to FIGS. 15B, 15C, and 15E) is conceivable. Further, it is possible to allow the different poles of respective magnets 66 and 67 adjacent to each other so that the respective two poles can face the Hall IC 60 (refer to FIGS. 15C and 15D), and it is also possible to have a structure in which many magnet poles can face the Hall IC 60 (refer to FIG. 15E). Needless to say, these combinations are only examples, and are not exhaustive, it is possible to provide various combinations in consideration of the output characteristics of the Hall IC 60. Even in that event, it is also possible to adjust the output characteristics by providing a plurality of Hall ICs 60.

It should be noted that in all of the third to fifth embodiments described above, a Hall IC is used as a magnetic sensor, it is also possible to employ other magnetic sensors such as a magnetic reluctance element or the like.

The seat structure of the present invention includes a torsion bar as an elastic supporting-mechanism for elastically supporting a cushioning member, arms and a supporting frame pivoted by the torsion bar. Accordingly, by providing a displacement detecting mechanism for determining an amount of twist or a twist angle of the torsion bar, or a pivot angle of the arm, displaced by being seated by a person, it becomes possible to structure a device for determining a load on the seat with extremely simple structure. Besides, since it is structured to mount only extremely small parts such as a strain gauge, an angle sensor, or a combination of a Hall IC and magnets on a torsion bar and arms, it is possible to detect the load on the seat due to a seated person without interfering with other functions of the seat structure such as vibration absorption, impact absorption, and the like, with no modification of a mounting structure for an annexed mechanism such as a slide adjuster and a reclining mechanism, even in such cases of installing the displacement detecting mechanism constituting a device for determining a load on the seat.

What is claimed is:

1. A seat structure comprising a cushioning member strained over a seat cushion via an elastic supporting-mechanism, wherein
    said elastic supporting-mechanism is structured including a torsion bar disposed in the rear of a seat cushion and a supporting frame connected to the torsion bar and biased to tilt backwards in a normal state;
    said supporting frame is supported via an arm connected to said torsion bar;
    said cushioning member is supported by said supporting frame, and strained by the elastic force of said torsion bar; and
    a displacement detecting mechanism is provided for detecting displacement of said elastic supporting-mechanism when a load is applied to said cushioning member, so that the load applied to the cushioning member is detectable from a displacement signal detected by the displacement detecting mechanism.

2. The seat structure according to claim 1, wherein said displacement detecting mechanism is composed of a combination of a magnet and a magnetic sensor which changes its output characteristics according to the magnetic flux density of the magnet, and one is mounted on said arm member and the other is mounted on a frame member forming the seat cushion.

3. The seat structure according to claim 1, wherein said displacement detecting mechanism is structured to include a strain gauge mounted on said torsion bar to measure the amount of twist in the torsion bar with the strain gauge.

4. The seat structure according to claim 1, wherein said displacement detecting mechanism is structured to include an angle sensor connected to a movable end of said torsion bar to measure the twist angle of the torsion bar with the angle sensor.

5. The seat structure according to claim 2, wherein said magnetic sensor is a Hall IC.

6. A device for determining a load on the seat provided on a seat structure comprising: a torsion bar disposed in the rear of a seat cushion; and a supporting frame connected to the torsion bar and biased to tilt backwards in a normal state, and structured that a cushioning member is supported by said supporting frame and strained by the elastic force of said torsion bar, comprising:
    a displacement detecting mechanism to detect displacement of said elastic supporting-mechanism when a load is applied to said cushioning member, so that the load applied to the cushioning member is determined from a displacement signal detected by the displacement detecting mechanism.

7. The device for determining a load on the seat according to claim 6, wherein said displacement detecting mechanism is structured to include a strain gauge mounted on said torsion bar to measure the amount of twist in the torsion bar with the strain gauge.

8. The device for determining a load on the seat according to claim 6, wherein said displacement detecting mechanism is structured to include an angle sensor connected to a movable end of said torsion bar to measure the twist angle of the torsion bar with the angle sensor.

9. The device for determining a load on the seat according to claim 6, wherein said displacement detecting mechanism comprises a combination of a magnet and a magnetic sensor which changes its output characteristics according to the magnetic flux density of the magnet, and one is mounted on the arm member connected to said torsion bar and the other is mounted on a frame member forming the seat cushion.

* * * * *